United States Patent [19]

Tokoro et al.

[11] Patent Number: 4,631,043
[45] Date of Patent: Dec. 23, 1986

[54] HYDRAULIC CONTROL APPARATUS FOR A CONTINUOUSLY VARIABLE TRANSMISSION

[75] Inventors: Setsuo Tokoro; Takashi Shigematsu; Tomoyuki Watanabe, all of Susono, Japan

[73] Assignee: Toyota Jidosha Kabushiki Kaisha, Aichi, Japan

[21] Appl. No.: 606,467

[22] Filed: May 3, 1984

[51] Int. Cl.⁴ .......................................... F16H 11/06
[52] U.S. Cl. ...................................... 474/18; 474/28
[58] Field of Search ................... 474/18, 28, 70, 11, 474/17; 364/424.1

[56] References Cited

U.S. PATENT DOCUMENTS 4,459,879  7/1984  Miki et al. .................... 474/28 X
4,547,178  10/1985  Hayakawa et al. ............ 474/28 X Primary Examiner—Stephen J. Novosad
Assistant Examiner—Thuy M. Bui
Attorney, Agent, or Firm—Parkhurst & Oliff

[57] ABSTRACT

A hydraulic control apparatus for controlling a line pressure utilized in a continuously variable transmission. The apparatus controls the amount of line pressure supplied to be as small as possible without resulting in any slippage between a belt member which spans the pulleys. The apparatus monitors torque on the input shaft and output shaft to determine if any slippage is occurring.

31 Claims, 9 Drawing Figures

HYDRAULIC CONTROL APPARATUS FOR A CONTINUOUSLY VARIABLE TRANSMISSION

BACKGROUND OF THE INVENTION

The present invention relates to a hydraulic control apparatus for a continuous variable transmission mounted on a vehicle, and more particularly to a hydraulic control apparatus for controlling a line pressure supplied to a hydraulic cylinder of a driven pulley to prevent a belt member from slipping within a groove of the driven pulley.

A continuously variable transmission controls a speed ratio, also referred to as revolution ratio, between the driving and driven pulleys in such a manner that permits a minimum amount of fuel to be consumed.

The continuously variable transmission has a V-belt extending between a driving pulley and a driven pulley, the belt transferring the revolutions of the driving pulley to the driven pulley. The revolution ratio between the driven pulley and the driving pulley is controlled by varying the size of a V-shaped opening in the driving and driven pulleys within which the V-belt rotates. The size of the V-shaped opening is varied by changing the amount of pressure being fed into a hydraulic cylinder of the driving pulley and a hydraulic cylinder of the driven pulley. Hence, the effective diameter of the pulleys can be varied by changing the amount of force applied to the belt, thereby allowing for a continuously varying rotation ratio between the driven pulley and the driving pulley. The V-shaped openings on the driving and driven pulleys are each defined by an area between a fixed number of the pulley and a movable member of the pulley, the size of the V-shaped opening being dependent upon the pressure inputted to the respective hydraulic cylinders. In order to provide hydraulic pressure to each of the movable pulleys, a hydraulic control apparatus is provided.

The hydraulic control apparatus controls the line pressure supplied to the hydraulic cylinder of the driven pulley in an amount which is proportional to the amount of torque transmitted from the V-belt to the driven pulley. The hydraulic pressure in the hydraulic cylinder of the driving pulley controls the revolution ratio between the driven pulley and the driving pulley. The hydraulic control apparatus has a regulator valve which controls the amount of line pressure supplied to the hydraulic cylinder of the driven pulley. If the value of the supplied line pressure is less than a requisite amount for transmitting torque from the V-belt to the driven pulley, slipping occurs between the V-belt and the driven pulley making the tansmission of torque from the V-belt to the driven pulley inefficient. Conversely, if the amount of line pressure supplied to the hydraulic cylinder of the driven pulley is much greater than the requisite amount of line pressure for transmitting torque from the V-belt to the driven pulley, the result is severe wear upon the continuously variable transmission and the hydraulic fluid pump.

It is theoretically possible to maintain an optimum control of the line pressure supplied to the hydraulic cylinder of the driving pulley if the coefficient of friction generated between the V-belt and the driven pulley can be quantified. The coefficient of friction varies as a function of the temperature of the hydraulic fluid, the amount of wear exhibited by the V-belt and the rotating speed of the belt. Hence, a hydraulic control apparatus for a continuously variable transmission is designed to supply a line pressure greater than the requisite pressure to eliminate slippage between the V-belt and the driven pulley during all possible driving conditions and to ensure the transfer of torque between the V-belt and the driven pulley.

When the value of the line pressure gradually drops and becomes less than a predetermined value, the V-belt begins to slip on the surfaces of the driven pulley. When the V-belt begins to slip, a ratio between torques of the output shaft and input shaft rapidly decreases the amplitude of a vibration in torque of the driven pulley generated by a power stroke of an engine to the amplitude of a vibration of a torque of a crank shaft. In view of the above fact, it is possible to lower the value of the line pressure by detecting a variation in the torque ratio.

SUMMARY OF THE INVENTION

The present invention was made in view of the foregoing background and to overcome the foregoing drawbacks. It is accordingly an object of this invention to provide a hydraulic control apparatus for a continuously variable transmission which maintains a minimum amount of line pressure supplied to pulleys while providing a sufficient amount of line pressure for transferring torque between the V-belt and the pulleys.

To attain the above objects, the hydraulic control apparatus for a continuously variable transmission has a first sensor for detecting a frequency component of the torque from the input shaft to the driving pulley generated by the power stroke of the engine; and a second sensor for detecting the torque from the output shaft of the driven pulley. Further, the hydraulic control apparatus has a memory for storing an optimum predetermined ratio between amplitudes of the torque of the output shaft and the torque of the input shaft. The hydraulic control apparatus calculates the ratio between the torque of the output shaft detected by the second sensor and the torque of the input shaft detected by the first sensor. When the calculated ratio is smaller than the optimum predetermined ratio stored by the memory means, the amount of line pressure supplied to the hydraulic cylinder of the driven pulley is increased and when the calculated ratio is larger than the stored ratio, the amount of line pressure supplied to the hydraulic cylinder of the driven pulley is decreased.

BRIEF DESCRIPTION OF THE DRAWINGS

The above objects, features and advantages of the present invention will become more apparent from the following description of the preferred embodiments taken in conjunction with the accompanying drawings, wherein.

DETAILED DESCRIPTION OF THE PREFERRED EMBODIMENTS

The present invention is described in detail with reference to the accompanying drawings which illustrate different embodiments of the present invention.

Figure 1:
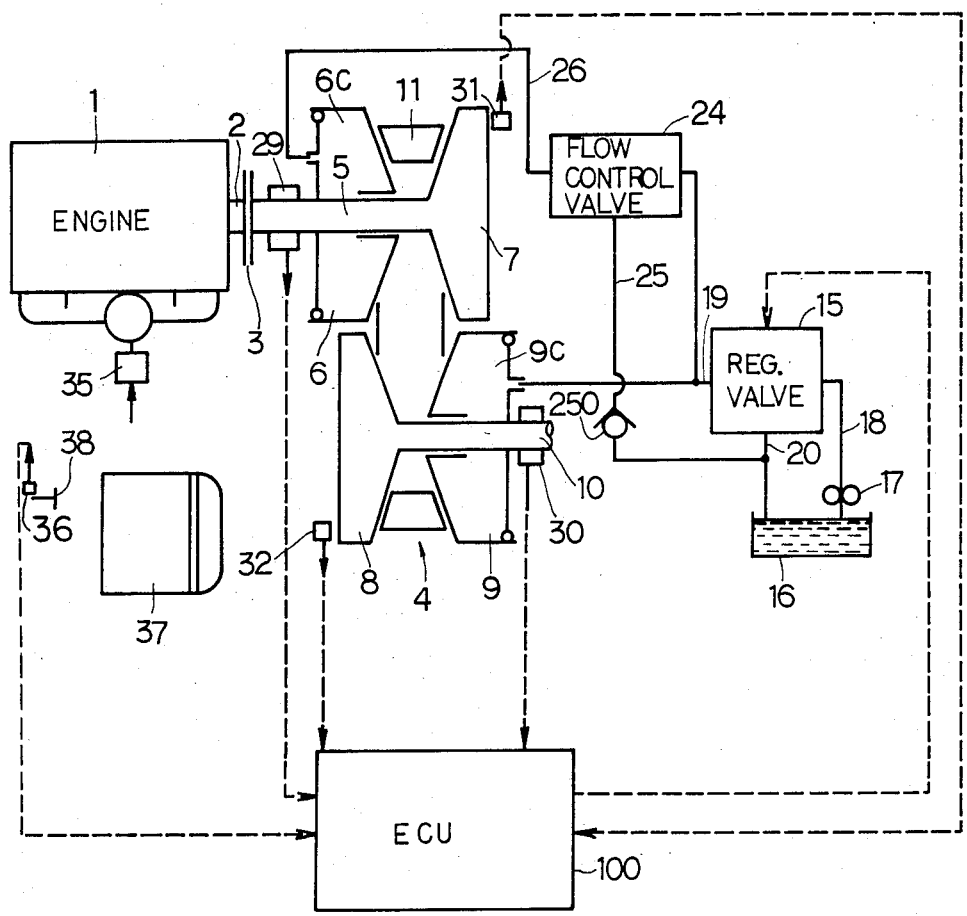
FIG. 1 is a schematic view of a continuously variable transmission utilizing a hydraulic control apparatus according to the present invention.

FIG. 1 shows a schematic view of a continuously variable transmission utilizing a hydraulic control apparatus according to the present invention. An engine 1 is connected through a crank shaft 2 and a clutch 3 with a shaft 5. The shaft 5 is an input shaft connected with a continuously variable transmission 4(hereinafter referred to as CVT). The CVT 4 comprises a driving pulley including the members 6 and 7, and a driving pulley including the members 8 and 9. The driving pulley is mounted on a driving and input shaft 5, which is driven by the engine 1. The driven pulley is mounted on a driven and output shaft 10. The torque of the shaft 10 is transmitted to wheels of a vehicle or the like (not shown in drawings). A torque transmitting continuous V-belt 11 extends between the pulleys 6, 7 and 8, 9. The driving pulley comprises a movable member 6 and a non-movable member 7. The movable member 6 is axially displaced on and rotates with the input shaft 5. The non-movable member is fixed to and rotates with the input shaft 5. The movable member 6 is axially displaced by the pressure exerted upon it by a hydraulic cylinder 6c. When the member 6 is axially displaced in a direction toward the non-movable member 7, the width between the members 6 and 7 is decreased. This results in an increase in the effective diameter of the driving pulley 6, 7. As a result, the speed ratio of revolution ratio "e", i.e., [(the rotating speed of the driven pulley 8 and 9)/(the rotating speed of the driving pulley 6 and 7; $RPM_{out}/RPM_{in}$)] is increased. The $RPM_{in}$ is equivalent to the engine speed, $RPM_e$.

Similarly, the driven pulley 8, 9 comprises a movable member 9, which is axially displaced on and rotatable with the output shaft 10, and a non-movable member 8, which is fixed to and rotatable with the output shaft 10. The movable member 9 is axially displaced by the pressure exerted upon it by a hydraulic cylinder 9c. When the movable member 9 is axially displaced in a direction toward the non-movable member 8, the width between the members 8 and 9 is decreased. This results in an increase in the effective diameter of the driven pulley 8, 9.

To minimize the amount of engine power consumed by a hydraulic fluid pump, the hydraulic pressure in the cylinder 9c is controlled to be as small as possible while maintaining a slip-free torque transfer between the belt 11 and the driven pulley 8, 9. The hydraulic pressure in the hydraulic cylinder 6c of the driving pulley is varied to adjust the speed or revolution ratio. The amount of pressure in the hydraulic cylinder 6c is designed to be smaller than that of the hydraulic pressure in the hydraulic cylinder 9c. However, even though the value of the hydraulic pressure supplied to the hydraulic cylinder 6c is less than the value of the hydraulic pressure supplied to the hydraulic cylinder 9c, the system is designed so that a greater overall hydraulic pressure can be realized in the hydraulic cylinder 6c than in the hydraulic cylinder 9c because a larger area is subjected to the hydraulic pressure in the cylinder 6c than in the hydraulic cylinder 9c.

A hydraulic fluid pump 17, driven by a motor, pumps a hydraulic fluid from a reservoir 16 to a regulator valve 15. The regulator valve 15 controls the pressure supplied to a passage 19 by adjusting an amount of fluid drained from the system, thereby generating a specific line pressure in the passage 19. The regulator valve 15 supplies the line pressure through the passage 19 to the hydraulic cylinder 9c of the driven pulley 8, 9 and to a flow control valve 24. The flow control valve 24 is a three port connection valve, and includes an inlet port communicated with the passage 19, a drain port communicated with a drain passage 25 and an outlet port communicated through a passage 26 with the hydraulic cylinder 6c of the driving pulley 6, 7. When the flow control valve 24 is in a first position, the inlet port communicates with the outlet port. When the flow control valve 24 is in a second position, there is no communication between the three ports. Finally, when the flow control valve 24 is in a third position, the outlet port communicates with the drain port. A check valve 250 is provided on the drain passage 25. The check valve 250 allows hydraulic fluid to flow in only a single direction, from the flow control valve 24 to the hydraulic fluid reservoir 16.

A first torque sensor 29 is a non-contact type torque sensing device which detects a torque of the input shaft 5 by detecting variations in a magnetic field created between two portions of the torque sensor. Similarly, a second torque sensor 30 is also a non-contact type torque sensing device which detects a torque of the output shaft 10 by detecting variations in a magnetic field created between the portions of the torque sensor. A sensor 31 detects the rotating speed ($RPM_{in}$) of the driving pulley 6, 7. A sensor 32 detects the rotating speed ($RPM_{out}$) of the driven pulley 8, 9. A throttle actuator 35 controls an amount of opening in a throttle valve. An accelerator pedal sensor 36 detects an amount of displacement of an accelerator pedal 38 installed adjacent to an operator's seat.

When the hydraulic pressure in the hydraulic cylinder 9c of the driven pulley 9 increases, the movable member 9 is axially displaced toward the non-movable member 8. This results in the V-belt contacting the driven pulley 8, 9 at points which are radially further outward upon the driven pulley. The value of the line pressure is controlled so that no slippage occurs between the belt 11 and the driven pulley 8, 9. When the hydraulic pressure in the hydraulic cylinder 6c of the driving pulley 6 increases, the movable member 6 is axially displaced toward the non-movable member 9. This also results in the V-belt contacting the driving pulley 6, 7 at points which are radially further outward upon the driven pulley. Thus, the speed ratio (revolution ratio) of the CVT 4 is controlled through the axial displacement of the movable members 6 and 9 of the driving and driven pulleys on their input and output shafts, respectively.

According to the present invention, the desired horsepower in an engine is a function of the displacement of the accelerator pedal 38. Further, the desired engine torque and the desired engine speed are a function of the desired horsepower; the amount of opening of the throttle valve is a function of the desired torque; and the speed ratio (revolution ratio) of the CVT 4 is a function of the desired engine speed.

Figure 2:
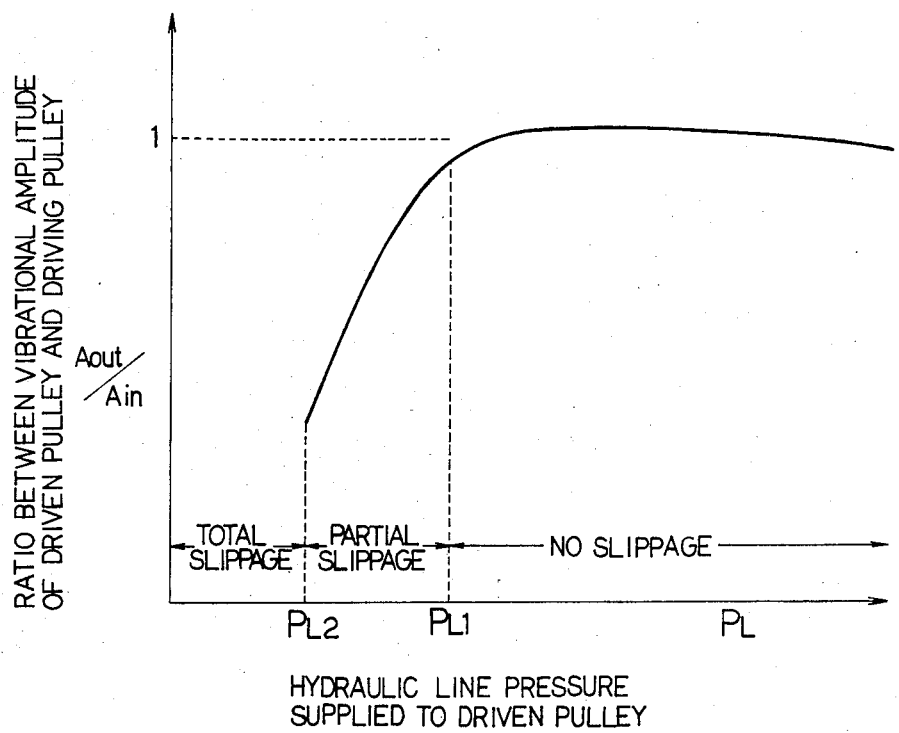
FIG. 2 is a graph illustrating the relationship between a line pressure and a ratio of the amplitude of a vibration of torque from the driven pulley to an amplitude of a vibration or torque from a crank shaft, according to a first embodiment of the present invention.

FIG. 2 shows a graph illustrating the relationship between a hydraulic line pressure $P_L$ supplied to the hydraulic cylinder 9c of a driven pulley and a ratio between the amplitude of vibrations from the torque of a crankshaft 2, generated by imbalances in the power stroke of the engine ($A_{out}$), and the amplitude of vibrations from the torque of the driven pulley ($A_{in}$), i.e. ($A_{out}/A_{in}$), according to a first embodiment of the present invention.

The engine 1, according to the present invention, is a four-stroke engine, and has four cylinders, resulting in two explosions occurring in the engine 1 for every revolution of the crankshaft 2. When the line pressure $P_L$ supplied to the hydraulic cylinder 9c of the driven pulley is of a value which is greater than $P_{L1}$, the ratio, $A_{out}/A_{in}$ is nearly equal to a fixed value $\simeq 1$ even when allowing for slight decreases in the line pressure $P_L$. However, when the line pressure $P_L$ supplied to the hydraulic cylinder 9c is less than a value $P_{L1}$, slipping occurs between the V-belt 11 and the pulleys 6, 7 and 8, 9. Additionally, a slight decrease in the line pressure $P_L$ at the point $P_{L1}$, results in the ratio, $A_{out}/A_{in}$ rapidly decreasing. When the line pressure $P_L$ is equal to a value $P_{L2}$, the V-belt 11 completely slips on the surfaces of the pulley 8, 9.

Since slippage between the V-belt and the driving and driven pulleys begins when the hydraulic pressure in the driven pulley decreases to a value just below $P_{L1}$, the apparatus according to the present invention is designed to monitor the ratio $A_{out}/A_{in}$ from the signals of the torque sensors 29 and 30, and thereafter control the line pressure $P_L$ in accordance with the detected signals from the torque sensors, thereby adjusting the line pressure $P_L$ to a value approximately equal to $P_{L1}$. Hence, by monitoring the actual variation of the ratio, $A_{out}/A_{in}$, and by increasing or decreasing the value of the line pressure $P_L$, the V-belt can be prevented from slipping by maintaining a ratio of $A_{out}/A_{in}$ and $P_L$ such that it is larger than a predetermined value.

Figure 3:
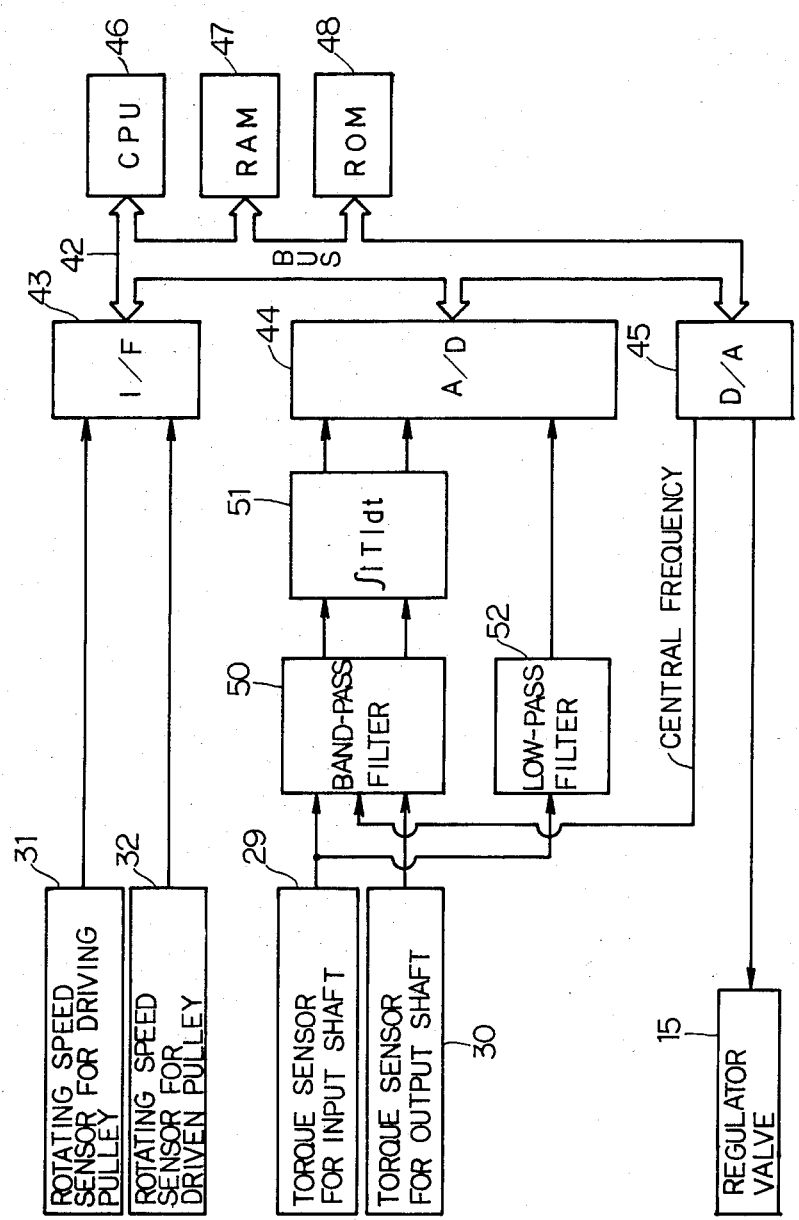
FIG. 3 is a circuit diagram of an electronic control unit employed in a first embodiment of the present invention.

The ECU 100 controls the regulator valve 15 in accordance with the signals detected by the sensors. FIG. 3 shows that the ECU 100 functions as a digital computer, and has a central processing unit 46 (hereinafter referred to as CPU) which carries out arithmetic and logic processing means, an inter-face 43 (hereinafter referred to as a I/F), an analog-digital converter 44 (hereinafter referred to as A/D), a random-access memory 47 (hereinafter referred to as RAM) which temporarily stores the calculated data of the CPU 46, a read-only memory 48 (hereinafter referred to as ROM) which stores a predetermined control program and arithmetic constants therein, and a digital-analog converter 45 (hereinafter referred to as D/A). An example of how the ECU 100 functions is given by the following. The I/F 43 receives an output signal from the sensor 31, corresponding to the rotating speed $RPM_{in}$ of the driving pulley 6, 7, and an output signal from the sensor 32 for detecting the rotating speed $RPM_{out}$ of the driven pulley 8, 9. A band-pass filter 50 receives an output signal from the torque sensor 29, for detecting a torque on the input shaft 5, and an output signal from the torque sensor 30, for detecting a torque on the output shaft 10. A low-pass filter 52 also receives the output signal from the torque sensor 29. The A/D 44 receives an output signal from the band-pass filter 50, having first been passed through an integrator 51 for integrating absolute values of the torque of the input shaft 5 and the output shaft 10. The A/D 44 also receives an output signal from the low-pass filter 52. The CPU 46, a microprocessor, then compares the received information with any stored information, and issues an output to the D/A 45, which then subsequently outputs the appropriate instructions to the regulator valve 15. The output signal of the D/A 45 is also inputted to the band-pass filter 50 and controls the central frequency of the band-pass filter 50.

Figure 4:
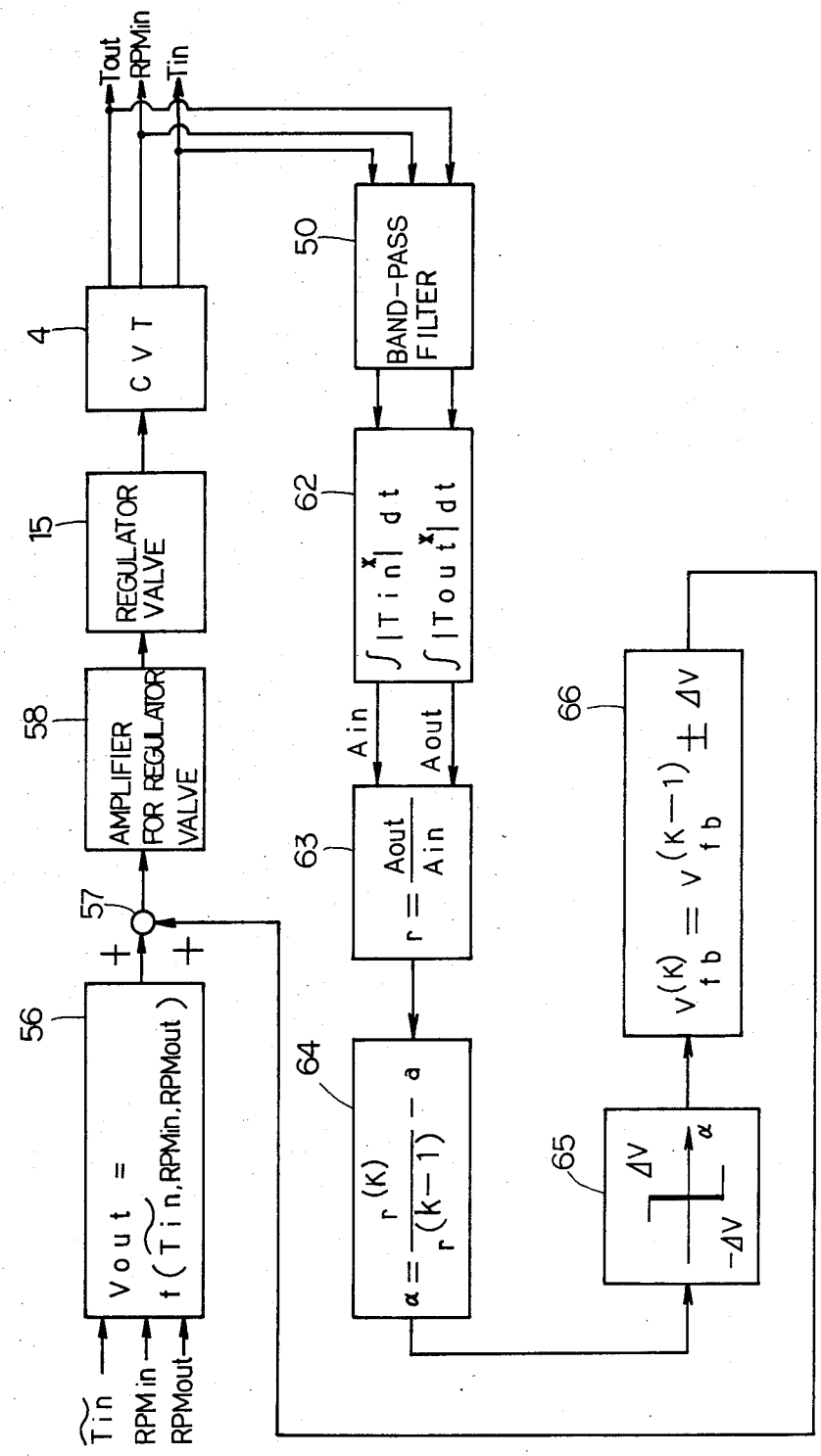
FIG. 4 is a block diagram according to a first embodiment of the present invention.

FIG. 4 shows a block diagram employing in the first embodiment of the present invention. In a block 56, a value of an input voltage for the amplifier 58, $V_{out}$, is calculated from the direct current component of the torque $T_{in}$ of the input shaft 5, the rotating speed $RPM_{in}$ of the input shaft 5, and the rotating speed $RPM_{out}$ of the output shaft 10. $V_{out}$ is calculated by the following equation:

$$V_{out}=K \cdot \bar{T}_{in} \cdot (RPM_{in}/RPM_{out})$$

where, $K$=constant.

The value of $V_{out}$ is calculated to be slightly larger than a necessary value of the line pressure $P_L$ needed to prevent slippage of the V-belt on the driving and driven pulleys. The numeral 57 represents an adding point, whereby an amount can be added to the value of $V_{out}$ resulting in a higher line pressure $P_L$ being realized. The result of the adding step performed in block 57 is amplified by an amplifier 58 which is subsequently inputted to the regulator valve 15. The regulator valve 15 then controls the amount of hydraulic pressure fed into the CVT 4.

The band-pass filter 50 detects the frequency $f_t$ of the power stroke of the engine, per second, by using the rotating speed $RPM_{in}$ of the crankshaft 2 of the engine 1, multiplying by two power strokes per revolution and dividing by 60 ($f_t = 2 \cdot RPM_{in}/60$). The frequency $T^*_{in}$ of the input shaft 5 of the CVT 4 occurring during the power stroke of the engine and the frequency $T^*_{out}$ of the output shaft 10, of the CVT 4, also occurring during the power stroke of the engine, and both are inputted to the block 62. In the block 62, the absolute values of $T^*_{in}$ and $T^*_{out}$ are determined, i.e., $|T^*_{in}|$ and $|T^*_{out}|$. The $|T^*_{in}|$ and $|T^*_{out}|$ are integrated during repeated cycles of the engine and the amplitudes $A_{in}$ and $A_{out}$ of the $|T^*_{in}|$ and $|T^*_{out}|$, respectively, are determined.

The amplitudes $A_{in}$ and $A_{out}$ of $T_{in}^*$ and $T_{out}^*$, respectively, are inputted to a block 63. The block 63 calculates the ratio r between the amplitudes $A_{out}$ and $A_{in}$, i.e., (r=$A_{out}/A_{in}$). Next, a block 64 compares the ratio $r^{(k)}/r^{(k-1)}$ with the stored basic value "a". The numerator $r^{(k)}$ represents the ratio r which has been most recently calculated and the denominator $r^{(k-1)}$ represents the ratio r which was calculated immediately before the calculation of $r^{(k)}$. The stored value "a" is subtracted from the ratio $r^{(k)}/r^{(k-1)}$, i.e., ($r^{(k)}/r^{(-1)}-a$) to obtain a value $\alpha$.

The value of $\alpha$ is inputted to a block 65. The block 65 uses the calculated value of $\alpha$ such that when $\alpha$ is positive, $-\Delta V$ is selected as a compensated value (where $\Delta V$ is a positive quantity). When $\alpha$ is positive, the ratio $r^{(k)}/r^{(k-1)}$ is greater than or equal to "a". Hence, this corresponds to the ratio of the amplitudes $A_{out}/A_{in}$ being approximately equal to a predetermined fixed value, i.e., the asymptotic approach of the curve in FIG. 2 to the ratio value of 1. Conversely, when α is negative, $+\Delta V$ is selected as a compensated value. When α is negative, the ratio $r^{(k)}/r^{(k-1)}$ is less than the value of "a". Hence, this corresponds to the ratio of the amplitudes, $A_{out}/A_{in}$ being within the rapidly decreasing portion of the curve shown in FIG. 2.

In a block 66, a feedback value $V_{fb}^{(k)}$ is calculated by adding $\pm\Delta V$ to an immediately previous calculated feedback value, $V_{fb}^{(k-1)}$. The computations performed in the block 66 are inputted to the adding point 57. Then the sum of $V_{out}$ and $V_{fb}^{(k)}$ is calculated at the adding point 57. The calculated sum then becomes the input voltage ($V^*_{out}$) for the amplifier 58, which in turn controls the regulator valve 15 and the CVT 4.

Thus, when the ratio r of the amplitudes in approximately equal to 1, the value of the line pressure $P_L$ is designed to decrease until it reaches $P_{L1}$. However, when the ratio $r^{(k)}/r^{(k-1)}$ is less than the value "a" (corresponding to a negative value of α), the value of the line pressure $P_L$ is designed to increase until it reaches $P_{L1}$. When the ratio $r^{(k)}/r^{(k-1)}$ is less than the value "a", the ratio r of the amplitudes rapidly drops, the value of the line pressure $P_L$ is designed to increase. When the ratio $r^{(k)}/r^{(k-1)}$ is less than the value "a", the ratio of the amplitudes rapidly drops. The value of the line pressure $P_L$ is controlled to be equal to the value $P_{L1}$.

Figure 5:
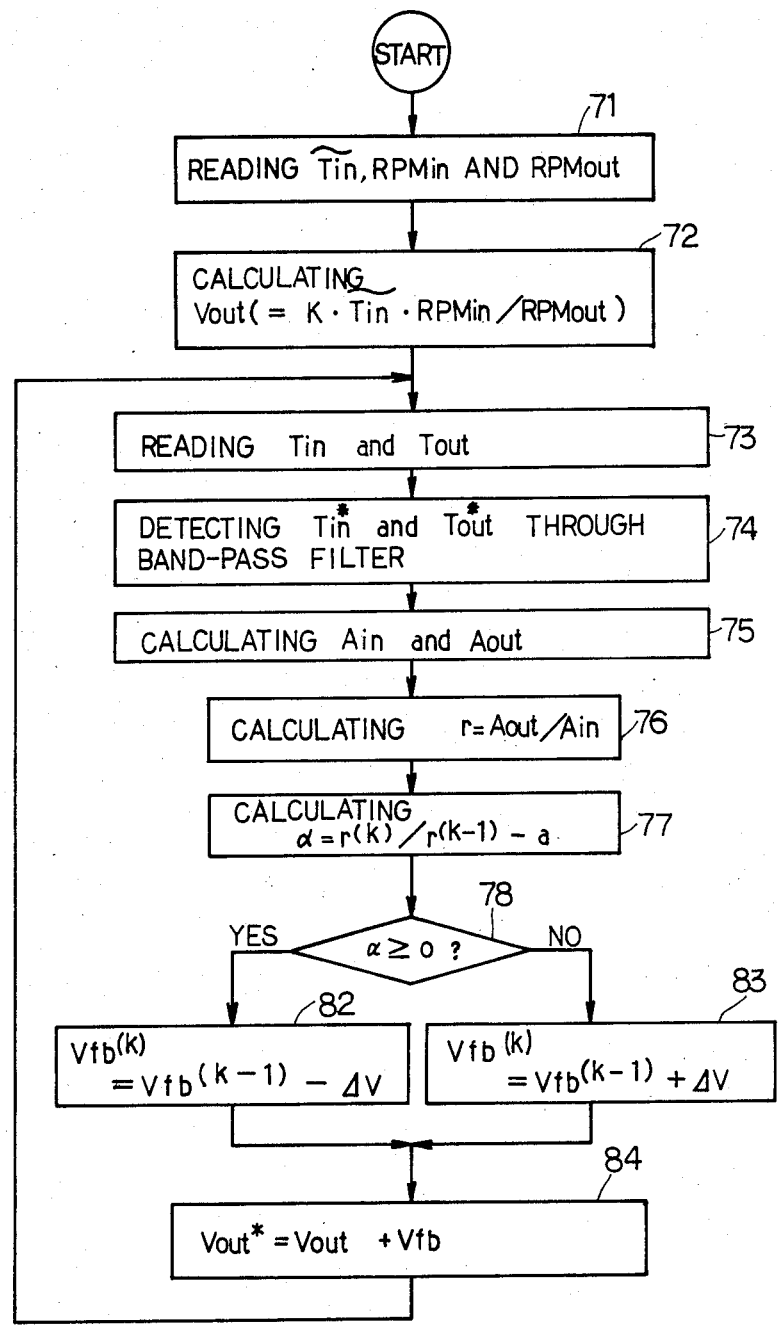
FIG. 5 is a flow chart of a program employed in the block diagram of FIG. 4.

FIG. 5 discloses a flow chart of the program employed in the block diagram of FIG. 4. In a step 71, the direct current component $\widetilde{T}_{in}$ of the torque of the input shaft 5, the rotating speed $RPM_{in}$ of the input shaft 5, and the rotating speed $RPM_{out}$ of the output shaft 10 are read. The program proceeds to a step 72. In the step 72, the initial input voltage ($V_{out}$) of the amplifier 58 is calculated by following equation:

$$V_{out}=K\cdot\widetilde{T}_{in}\cdot(RPM_{in}/RPM_{out})$$

The program proceeds to a step 73. In the step 73, the torque $T_{in}$ of the input shaft 5, the torque $T_{out}$ of the output shaft 10, and the rotating speed $RPM_{in}$ of the input shaft 5 are read. The rotating speed $RPM_{in}$ of the input shaft 5 is used to determine the frequency $f_t$ per second ($f_t=2\cdot RPM_{in}/60$) of the power stroke of the engine. The program proceeds to a step 74, whereby the frequency components $T^*_{in}$ and $T^*_{out}$ at the power stroke of the engine are detected through the band-pass filter, from the torque $T_{in}$ of the input shaft 5 and the torque $T_{out}$ of the output shaft 10, respectively. In a step 75, the amplitudes $A_{in}$ and $A_{out}$ of the frequency components $T^*_{in}$ and $T^*_{out}$, respectively, are calculated. Next, in a step 76, the ratio r ($r=A_{out}/A_{in}$) of the amplitudes is calculated. In a step 77, the value of α is calculated by following equation:

$$\alpha = r^{(k)}/r^{(k-1)} - a$$

The program proceeds to a step 78, wherein the value of α is compared with zero. If the value of α is greater than or equal to zero, the program proceeds to a step 82. However, if the value of α is negative, the program proceeds to a step 83. In the step 82, the value, $(V_{fb}^{(k-1)} - \Delta V)$ is substitued for $V_{fb}^{(k)}$. In the step 83, the value, $(V_{fb}^{(k-1)} + \Delta V)$ is substituted for $V_{fb}^{(k)}$. The program then proceeds to a step 84, where the input voltage $V^*_{out}$ of the amplifier 58 for the regulator valve 15 is calculated by the following equation:

$$V^*_{out} = V_{out} + V_{fb}$$

where; $V_{fb} = V^*_{fb}{}^{(k)}$.

Hence, the amount of hydraulic pressure supplied to the CVT is controlled. The program then proceeds back to step 84, so that a continuous control of the CVT can be maintained.

Figure 6:
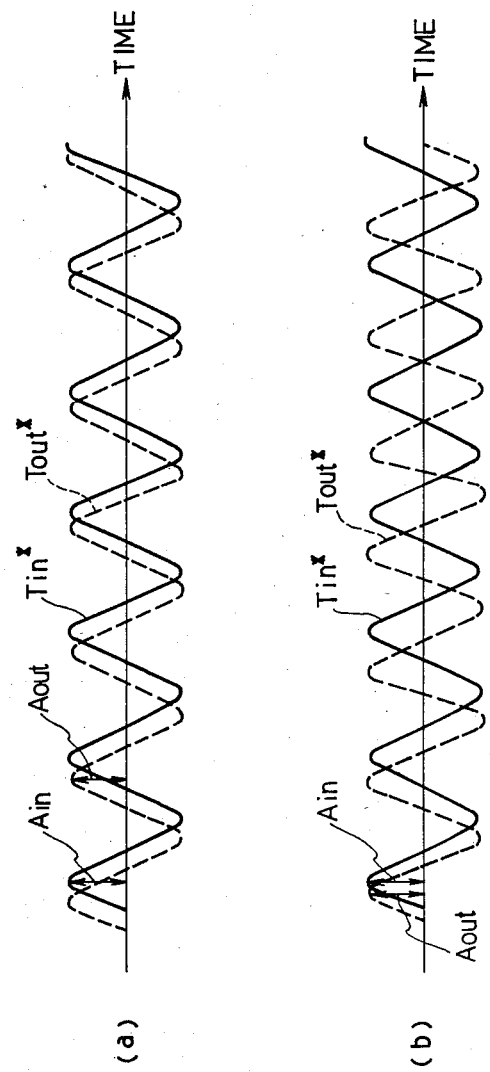
FIG. 6 is a graph illustrating a frequency component of the power stroke of the engine according to a second embodiment of the present invention.

FIG. 6 shows the frequency components of the torques $T^*_{in}$ and $T^*_{out}$. The curves in FIG. 6 are generated by imbalances in the power stroke of the engine. When the line pressure $P_L$ is sufficient to transfer torque between the V-belt 11 and the pulleys 6, 7 and 8, 9 and no slippage occurs between the V-belt and either of the pulleys, the phase difference between the frequency components $T^*_{in}$ and $T^*_{out}$ is maintained at a value within a predetermined scope b (as represented in step 94 of FIG. 7) or range. When the line pressure $P_L$ is not sufficient to transfer torque between the V-belt 11 and the pulleys 6, 7 and 8, 9, the phase difference between the frequency components $T^*_{in}$ and $T^*_{out}$ may exceed a scope defined between $+180°$ and $-180°$. When this occurs, the invention determines that no slippage is occurring. However, when the phase difference exceeds $180°$ or $-180°$, the invention determines that slippage is occurring. For example, whenever a phase difference of $\pm 30°$ is detected, the invention determines that no slippage is occurring. But when the phase difference is $\pm 200°$, the invention determines that slippage is occurring. Hence, it is possible to maintain the value of the line pressure $P_L$ near a predetermined value by detecting any occurrence of slippage by monitoring the phase difference between the frequency components $T^*_{in}$ and $T^*_{out}$. The predetermined value of the line pressure $P_L$ is selected to be as small as possible without causing any slippage between the V-belt 11 and the pulleys 6, 7 and 8, 9.

Figure 7:
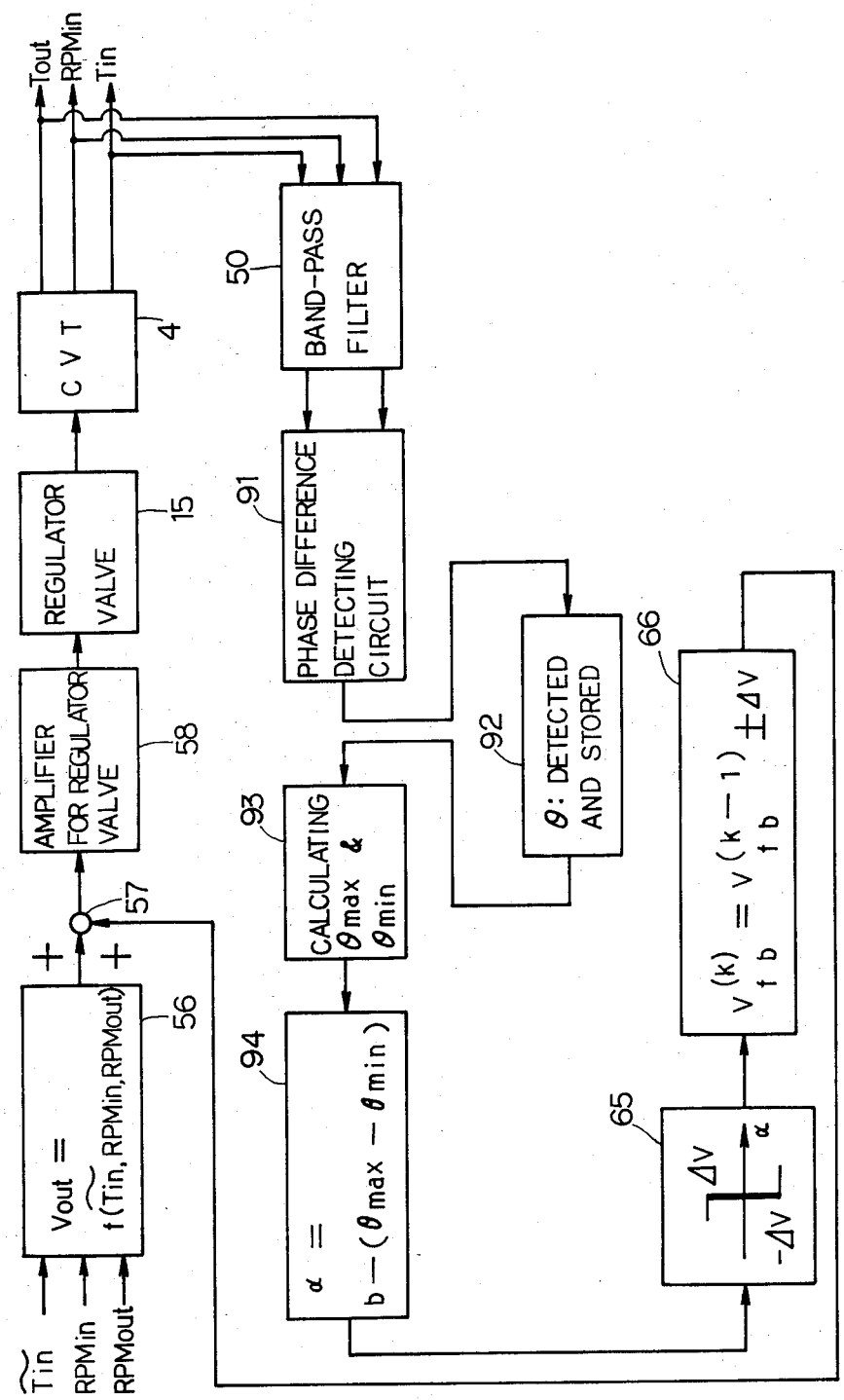
FIG. 7 is a block diagram according to a second embodiment of the present invention.

FIG. 7 shows a block diagram of a second embodiment of the present invention. In a block 56, a value of the input voltage of the amplifier 58, $V_{out}$, is calculated from the direct current component $\widetilde{T}_{in}$ of the torque of the input shaft 5, the rotating speed $RPM_{in}$ of the input shaft 5, and the rotating speed $RPM_{out}$ of the output shaft 10. $V_{out}$ is calculated by the following equation:

$$V_{out}=K\cdot\widetilde{T}_{in}\cdot(RPM_{in}/RPM_{out})$$

where, $K$=constant.

The value of $V_{out}$ is calculated to be slightly larger than a necessary value of the line pressure $P_L$ needed to prevent slippage of the V-belt in the driving and driven pulleys. The numeral 57 represents an adding point, whereby an amount can be added to the value of $V_{out}$ resulting in a higher line pressure $P_L$. The result of the adding step performed in block 57 is amplified by the amplifier 58 which is subsequently inputted to the regulator valve 15. The regulator value 15 then controls the CVT 4.

The band-pass filter 50 detects the frequency $f_t$ ($f_t=2\cdot RPM_{in}/60$) of the power stroke of the engine per second, by using the rotating speed $RPM_{in}$ of the crankshaft 2 of the engine 1, multiplying by two power strokes per revolution and dividing by 60. The frequency $T^*_{in}$ of the input shaft 5 of the CVT 4 occurring during the power stroke of the engine and the frequency $T^*_{out}$ of the output shaft 10, of the CVT 4, also occurring during the power stroke of the engine, and both are inputted to a block 91. The block 91 is a phase difference detecting circuit which detects the phase difference $\theta$ between the frequencies $T^*_{in}$ and $T^*_{out}$, and stores the data. The program proceeds to a block 92, wherein the phase difference $\theta$ is detected a selected number of times (M) and the data is stored. The output of block 92 is fed to a block 93 which determines the maximum phase difference $\theta$ max and the minimum phase difference $\theta$ min from the selected number of phase differences M. The program proceeds to a block 94. In the block 94, the value, $b-(\theta \text{ max}-\theta \text{ min})$ is substituted for the value $\alpha$.

The value of $\alpha$ is inputted to a block 65 which uses the calculated value of $\alpha$ such that when the difference between the maximum phase difference $\theta$ max and the minimum phase difference $\theta$ min is greater than the value b, and $(-\Delta V)$ is selected as a compensated value, resulting in the value of the line pressure $P_L$ decreasing. However, when the difference between the maximum phase difference $\theta$ max and the minimum phase difference $\theta$ min is less than the value b, $(+\Delta V)$ is selected as a compensated value. Slipping occurs between the V-belt 11 and the pulleys 6, 7 and 8, 9 because of the drop in the line pressure $P_L$. This results in an increase in the phase difference between the maximum phase difference $\theta$ max and the minimum phase difference $\theta$ min. In this condition, $(+\Delta V)$ is selected as a compensated value in the block 65, and the line pressure $P_L$ is maintained at a minimum value at which no slippage occurs between the pulleys 6, 7 and 8, 9 and the V-belt 11.

Figure 8:
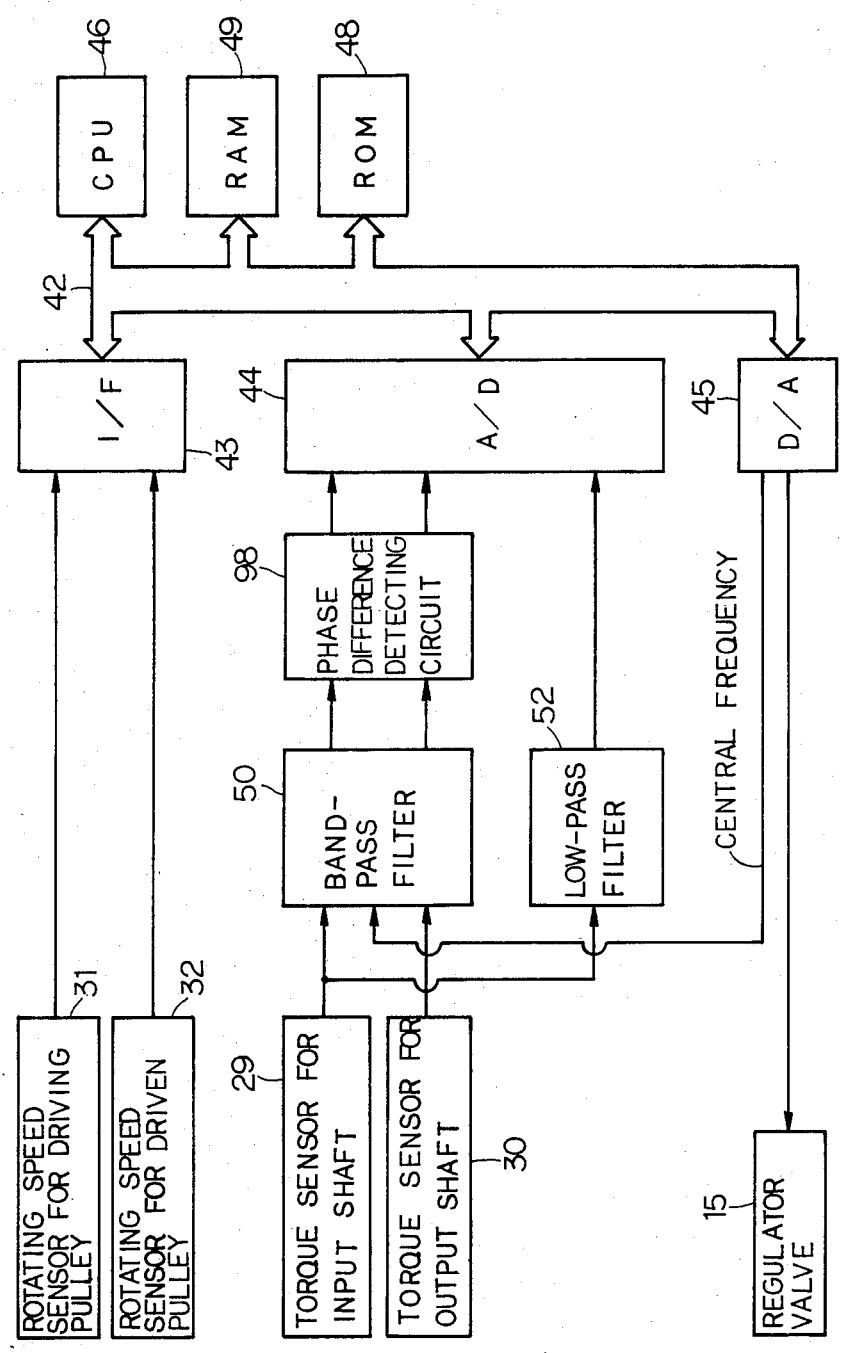
FIG. 8 is a circuit diagram of an electronic control unit employed in a second embodiment of the present invention.

An electronic control unit, operated by the block diagram shown in FIG. 7, has a phase difference detecting circuit 98, as shown in FIG. 8. The phase difference between the frequency component $T^*_{in}$ of the input shaft 5 and the frequency component $T^*_{out}$ of the output shaft 10, is converted to a digital signal by the A/D 44. The major difference between the first embodiment disclosed in FIG. 4 and the second embodiment disclosed in FIG. 6, is that the first embodiment monitors a ratio between an amplitude of the torque on the output shaft and an amplitude of the torque on the input shaft to control an amount of hydraulic pressure applied to the CVT 4, where the second embodiment monitors a phase difference between torques on the output shaft and input shaft to control an amount of hydraulic pressure supplied to the CVT 4. The other elements shown in FIG. 8 are the same as those described in conjunction with FIG. 3.

Figure 9:
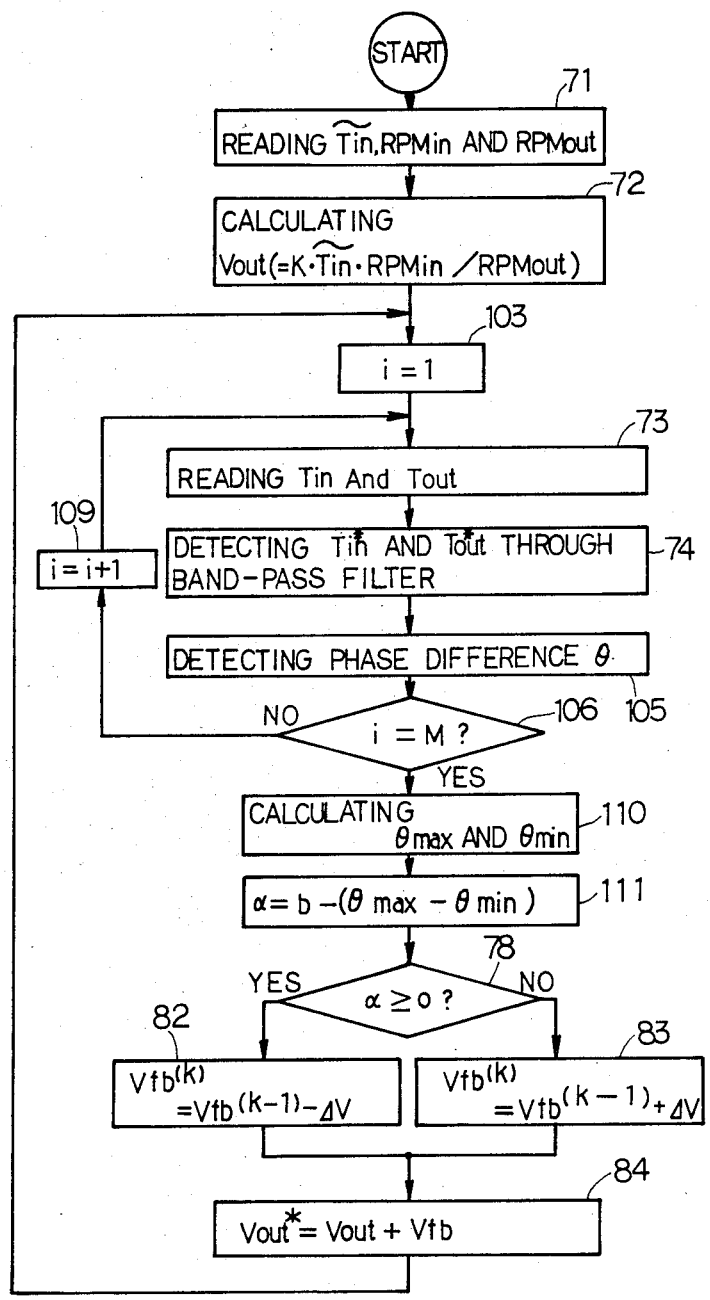
FIG. 9 is a flow chart of a program employed in the block diagram of FIG. 7.

FIG. 9 discloses a flow chart of the program employed in the block diagram of FIG. 7. In a step 71, the direct current component $\overline{T}_{in}$ of the torque of the input shaft 5, the rotating speed $RPM_{in}$ of the input shaft 5, and the rotating speed $RPM_{out}$ of the output shaft 10 are read. The program proceeds to a step 72. In the step 72, the initial input voltage $(V_{out})$ of the amplifier 58 is calculated by the following equation:

$$V_{out}=K \cdot \overline{T}_{in} \cdot (RPM_{in}/RPM_{out})$$

The program proceeds to a step 103. In the step 103, "1" is substituted for i. The program proceeds to a step 73, wherein the torque $T_{in}$ of the input shaft 4, the torque $T_{out}$ of the output shaft 10, and the rotating speed $RPM_{in}$ of the input shaft 5 are read. The rotating speed $RPM_{in}$ of the input shaft 5 is used to determine the frequency $f_t$ per second (ft=2·$RPM_{in}$/60) of the power stroke of the engine. The program proceeds to a step 74, whereby the frequency components $T^*_{in}$ and $T^*_{out}$ at the power stroke of the engine are detected through the band-pass filter, from the torque $T_{in}$ of the input shaft 5 and the torque $T_{out}$ of the output shaft 10, respectively. The program proceeds to a step 105, wherein a phase difference $\theta$ between the frequency component $T^*_{in}$ of the input shaft 5 and the frequency component $T^*_{out}$ of the output shaft 10 is detected. The program proceeds to a step 106. In the step 106, the value i is compared with the value of M, "M" being a precise number of times the phase difference is calculated. If i is not equal to M, the program proceeds to a step 109. In the step 109, the value (i=i+1) is substituted for i. However, if i is equal to M, the program proceeds to a step 110, wherein the maximum phase difference $\theta$ max and the minimum phase difference $\theta$ min are selected from the M number of phase difference calculations. The program proceeds to a step 111, wherein the value, $b-(\theta \text{ max}-\theta \text{ min})$ is substituted for $\alpha$. The program then proceeds to a step 78 which determines if $\alpha$ is greater than or equal to zero, or less than zero. If the value of $\alpha$ is greater than or equal to zero, the program proceeds to a step 82. If the value of $\alpha$ is less than zero, the program proceeds to a step 83. In the step 82, the value $(V_{fb}^{(k-1)}-\Delta V)$ is substituted for $V_{fb}^{(k)}$; and in the step 83, the value $(V_{fb}^{(k-1)}+\Delta V)$ is substituted for $V_{fb}^{(k)}$. The program then proceeds to a step 84; and in the step 84, the input voltage $V^*_{out}$ of the amplifier 58, for the regulator valve 15, is calculated by the following equation:

$$V^*_{out}=V_{out}+V_{fb}$$

where, $V_{fb}=V_{fb}^{(k)}$.

Hence, the amount of hydraulic pressure supplied to the CVT is controlled. The program then proceeds back to step 103, so that a continuous control of the CVT can be maintained.

While the present invention has been described in its preferred embodiments, it is to be understood that the invention is not limited thereto, and may be otherwise embodied within the scope of the following claims.

What is claimed is:

1. A hydraulic control apparatus for controlling a RPM of an engine in a motor vehicle using a continuously variable transmission, the transmission having a driving pulley mounted in an input shaft, the driving pulley comprising a fixed member and a movable member, the movable member being actuated by a hydraulic cylinder to form a V-shaped opening between the movable member and the fixed member, a driven pulley mounted on an output shaft, the driven pulley comprising another fixed member and another movable member, the another movable member being similarly actuated by another hydraulic cylinder supplied with a line pressure to form another V-shaped opening between said another movable member and said another fixed member and an endless belt member spanning the pulleys so that an effective diameter of the pulleys can be varied with regard to each other so that different speed ratios can be obtained, comprising:
   a first torque sensing means for detecting an input torque on the input shaft of the driving pulley generated by the power stroke of the engine and for outputting an input torque signal, said first torque sensing means being in communication with said input shaft;

a second torque sensing means for detecting an output torque on the output shaft of the driven pulley generated by the power stroke of the engine and for outputting an output torque signal, said second torque sensing means being in communication with said output shaft;

a control circuit including:

a first calculating means for receiving the input and output torque signals and for calculating a first actual ratio between the output torque of the ouput shaft detected by the second torque sensing means and the input torque of the input shaft detected by the first torque sensing means, the first calculating means outputting at least a first calculated signal having a first value and a second calculated signal having a second value, said first calculating means outputting the second calculated signal a predetermined time period after outputting the first calculated signal;

a second calculating means for receiving the first and second calculated signals from the first calculating means and calculating a second actual ratio between the first value of the first calculated signal and the second value of the second calculated signal, the second calculating means outputting a third calculated signal, the third calculated signal being indicative of the second actual ratio;

a memory means for receiving said first and second calculated signals and for storing a predetermined ratio between the output torque of the output shaft and the input torque of the input shaft;

a comparison means for comparing the stored predetermined ratio with said second actual ratio of the third calculated signal, the comparison means outputting a comparison signal indicative of a result of the comparison; and hydraulic fluid control means for receiving said comparison signal and for controlling the line pressure supplied to said another hydraulic cylinder of the driven pulley in accordance with said comparison signal, whereby said control means increases the line pressure to obtain said predetermined ratio when said seeond actual ratio is less than the predetermined ratio, and decreases the line pressure to obtain said predetermined ratio when said second actual ratio is greater than the predetermined ratio.

2. The hydraulic control apparatus of claim 1, further comprising a flow control valve which functions to supplly said hydraulic cylinder of the driving pulley with hydraulic fluid.

3. The hydraulic control apparatus of claim 1, wherein said first and second values are ratios between an amplitude of vibration of said output torque on said output shaft and an amplitude of vibration of said input torque on said input shaft.

4. The apparatus of claim 1, wherein each of said first and said second torque sensing means includes a non-contact type torque sensing device having a first portion and a second portion.

5. The apparatus of claim 4, wherein detected variations in a magnetic field created between said first and said second portions correspond to an amount of torque.

6. A hydraulic control apparatus for controlling a RPM of an engine in a motor vehicle using a continuously variable transmission, the transmission having a driving pulley mounted on an input shaft, the driving pulley comprising a fixed member and a movable member, the movable member being actuated by a hydraulic cylinder to form a V-shaped opening between the movable member and the fixed member, a driven pulley mounted on an output shaft, the driven pulley comprising another fixed member and another movable member, the another movable member being similarly actuated by another hydraulic cylinder supplied with a line pressure to form another V-shaped opening between said another movable member and said another fixed member and an endless belt member spanning the pulleys so that an effective diameter of the pulleys can be varied with regard to each other so that different speed ratios can be obtained, comprising:

a first torque sensing means for detecting an amplitude of a frequency component of an input torque on the input shaft of the driving pulley generated by the power stroke of the engine, said first torque sensing means being in communication with said input shaft, said first torque sensing means outputting an input torque signal;

a second torque sensing means for detecting an amplitude of a frequency component of an output torque on the output shaft of the driven pulley generated by the power stroke of the engine, said second torque sensing means being in communication with said output shaft, said second torque sensing means outputting an output torque signal;

a control circuit including:

a first calculating means for receiving the input torque signal and output torque signal and for calculating a first actual amplitude ratio between the amplitude of the frequency component of the output torque on the output shaft generated by the power stroke of the engine and the amplitude of the frequency component of the input torque on the input shaft generated by the power stroke of the engine, the first calculating means being in communication with the first and second torque sensing means, the first calculating means outputting at least a first calculated signal having a first value and a second calculated signal having a second value, said first calculating means outputting the second calculated signal a predetermined time period after outputting said first calculated signal;

a second calculating means for receiving the first and second calculated signals from the first calculating means and for calculating a second actual amplitude ratio between the first value of the first calculated signal and the second value of the second calculated signal, the second calculating means outputting a third calculated signal which is indicative of said second actual amplitude ratio, said second calculating means being in communication with said first calculating means;

a memory means for storing a predetermined amplitude ratio between the amplitude of the frequency component of the output torque on the output shaft and the amplitude of the frequency component of the input torque on the input shaft;

a comparison means for comparing the stored predetermined ratio with the second actual amplitude ratio of the third calculated signal, the comparison means outputting a comparison signal indicative of said comparison; and a hydraulic fluid control means for receiving said comparison signal and for controlling the line pressure supplied to said another hydraulic cylinder to the driven pulley in accordance with the result of the comparison, whereby said control means increases the line pressure to obtain said predetermined amplitude ratio when said second actual amplitude ratio is less than said predetermined amplitude ratio and decreases the line pressure to obtain said predetermined amplitude ratio when said second actual amplitude ratio is greater than said predetermined amplitude ratio.

7. A method for controlling a RPM of an engine in a motor vehicle using a continuously variable transmission, the transmission having a driving pulley mounted on an input shaft, the driving pulley comprising a fixed member and a movable member, the movable member being actuated by a hydraulic cylinder to form a V-shaped opening between the movable member and the fixed member, a driven pulley mounted on an output shaft, the driven pulley comprising another fixed member and another movable member, the another movable member being similarly actuated by another hydraulic cylinder supplied with a line pressure to form another V-shaped opening between said another movable member and said another fixed member and an endless belt member spanning the pulleys so that an effective diameter of the pulleys can be varied with regard to each other so that different speed ratios can be obtained, a first torque sensing means, a second torque sensing means and a control circuit, said control circuit including a first calculating means, a memory means, a second calculating means, a comparison means and a hydraulic fluid control means, said method comprising the steps of:

detecting an input torque on the input shaft, a rotating speed of the input shaft and a rotating speed of the output shaft;

calculating an initial input voltage for a regulator valve;

detecting an output torque on the output shaft;

detecting frequency components of the input torque on the input shaft and the output torque on the output shaft;

calculating an amplitude of the frequency components of the input torque on the input shaft and an amplitude of the frequency component of the output torque on the output shaft;

calculating a first ratio between the amplitude of the frequency component of the output torque on the output shaft and the amplitude of the frequency component of the input torque on the input shaft;

calculating a second ratio between the amplitude of the frequency component of the output torque on the output shaft and the amplitude of the frequency component of the input torque on the input shaft, said second calculating step being performed a predetermined time period after said first calculating step;

calculating a third ratio between said first ratio and said second ratio;

comparing said calculated third ratio with a predetermined value and determining a compensating voltage in accordance with said comparison;

subtracting said compensating voltage from a previous feedback voltage value when said third ratio is greater than or equal to said predetermined value and adding said compensating voltage amount to a feedback voltage value when said third ratio is less than said predetermined value to create a compensated feedback voltage value;

adding the compensated feedback voltage value to the initial input voltage; and controlling the line pressure of said another hydraulic cylinder.

8. The method of claim 7, wherein said predetermined value is equal to zero.

9. A hydraulic control apparatus for controlling an RPM of an engine in a motor vehicle using a continuously variable transmission, the transmission having a driving pulley mounted on an input shaft, the driving pulley comprising a fixed member and a movable member, the movable member being actuated by a hydraulic cylinder to form a V-shaped opening between said moveable member and said fixed member, a driven pulley mounted on an output shaft, the driven pulley comprising another fixed member and another movable member, the another movable member being similarly actuated by another hydraulic cylinder supplied with a line pressure to form another V-shaped opening between said another moveable member and said another fixed member and an endless belt member spanning the driving and driven pulleys so that an effective diameter of the pulleys can be varied with regard to each other so that different speed ratios can be obtained, comprising:

a first detecting means for detecting a first parameter indicative of a torque on said input shaft of said driving pulley, the first detecting means being in communication with said input shaft, the first detecting means outputting an input torque signal;

a second detecting means for detecting a second parameter indicative of a torque on said output shaft of said driven pulley, the second detecting means being in communication with said output shaft, the second detecting means outputting an output torque signal; and a control circuit including a first calculating means which is in communication with said first and second detecting means for receiving the input and output torque signals and for calculating a first actual ratio between said first parameter and said second parameter, said first calculating means outputting at least a first calculated signal having a first value and a second calculated signal having a second value, said first calculating means outputting said second calculated signal a predetermined time period after outputting said first calculating signal;

a memory means for storing a predetermined ratio between said first parameter and said second parameter;

a second calculating means, which is in communication with said first calculating means, for receiving said first and second calculated signals from said first calculating means, said second calculating means calculating a second actual ratio between said first value of the first calculated signal and said second value of the second calculated signal, the second calculating means outputting a third calculated signal, the third calculated signal having a value indicative of the second actual ratio;

a comparison means for comparing said predetermined ratio with said second actual ratio, said comparison means being in communication with said memory means and said second calculating means, said comparison means outputting a comparison signal which is indicative of said comparison; and hydraulic fluid control means for controlling said line pressure supplied to said another hydraulic cylinder of said driven pulley in accordance with said comparison signal, whereby said control means increases said line pressure to obtain said predetermined ratio when said second actual ratio is less than said predetermined ratio, and decreases a line pressure to obtain said predetermined ratio when said second actual ratio is greater than said predetermined ratio.

10. A hydraulic control apparatus for controlling a RPM of an engine in a motor vehicle using a continuously variable transmission, said continuously variable transmission including a driving pulley mounted on an input shaft, the driving pulley comprising a fixed member and a movable member, the movable member being actuated by a hydraulic cylinder to form a V-shaped opening between said movable member and said fixed member, a driven pulley mounted on an output shaft, the driven pulley comprising another fixed member and another movable member, the another movable member being similarly actuated by another hydraulic cylinder between said another movable member and said another fixed member, and an endless belt member spanning the driving and driven pulleys so that an effective diameter of the pulleys can be varied with regard to each other so that different speed ratios can be obtained, comprising:

a first detecting means for detecting an input torque on the input shaft of the driving pulley, the first detecting means outputting at least a first input torque signal having a first input value and a second input torque signal having a second input value, the second input torque signal being detected a predetermined time period after detecting the first input torque signal;

a second detecting means for detecting an output torque on the output shaft of the driven pulley, the second detecting means outputting at least a first output torque signal having a first output value and a second output torque signal having a second output value, the second output torque being detected a predetermined time period after detecting the first output torque signal; and a control circuit including
a calculating means for receiving the first and second input and output torque signals and for calculating a first ratio between the first input and output values of the first input and output torque signals and for calculating a second ratio between the second input and output values of the second input and output torque signals and for calculating a third ratio between the first and second ratios, said calculating means being in communication with said first and second detecting means, a memory means for storing a predetermined value, a comparison means for comparing the stored predetermined value with said third ratio, the comparison means outputting a comparison signal indicative of the result of the comparison, said comparison means being in communication with said calculating means and said memory means, and a line pressure control means for receiving the comparison signal and for controlling the line pressure supplied to said another hydraulic cylinder of the driven pulley in accordance with said comparison signal, said line pressure control means being in communication with said comparison means, whereby the line pressure control means increases or decreases the line pressure so that an actual line pressure approaches an optimum line pressure.

11. The hydraulic control apparatus of claim 10, further comprising a band pass filter which detects a frequency of a power stroke of the engine.

12. The hydraulic control apparatus of claim 11, wherein the control circuit further comprises a determining means for determining absolute values of the input and output torques.

13. The hydraulic control apparatus of claim 12, wherein the determining means determines amplitudes of the input and output torques.

14. The hydraulic control apparatus of claim 13, wherein the calculating means calculates said first ratio between the first input and output values from said determined amplitudes of the input and output torques and said second ratio between the second input and output values from the determined amplitudes of the input and output torques.

15. The hydraulic control apparatus of claim 10, further comprising a determining means for determining a compensating value.

16. The hydraulic control apparatus of claim 15, wherein the compensating value is positive when the third ratio is less than the stored predetermined value and the compensating value is negative when the third ratio is greater than the stored predetermined value.

17. The hydraulic control apparatus of claim 16, further comprising a second calculating means for calculating a feedback voltage, the second calculating means outputting at least a first feedback voltage signal having a first feedback value indicative of a first voltage and a second feedback voltage signal having a second feedback value, the second feedback voltage signal being outputted a second predetermined time period after outputting the first feedback voltage signal, said second feedback value being calculated by adding the compensating value to the first feedback value signal.

18. The hydraulic control apparatus of claim 17, wherein the second calculating means calculates an input voltage and an initial value, the second calculating means calculating the input voltage by adding the second feedback value to the initial value.

19. The hydraulic control apparatus of claim 18, further comprising a third detecting means for detecting an input revolution number of the input shaft and a fourth detecting means for detecting an output revolution number of the ouput shaft, said third detecting means being in communication with said input shaft and said fourth detecting means being in communication with said output shaft.

20. The hydraulic control apparatus of claim 19, wherein the second calculating means calculates the initial value from the detected input torque of the input shaft, the detected input revolution number of the input shaft and the detected output revolution number of the output shaft.

21. The hydraulic control apparatus of claim 20, further comprising an amplifier which amplifies the input voltage and outputs an amplified input voltage to a regulator valve, whereby the regulator valve regulates the line pressure such that the actual line pressure approaches the optimum line pressure.

22. A method for controlling a RPM of an engine in a motor vehicle using a continuously variable transmission, said continuously variable transmission having a driving pulley mounted on an input shaft, the driving pulley comprising a fixed member and a movable member, the movable member being actuated by a hydraulic cylinder to form a V-shaped opening between said movable member and said fixed member, a driven pulley mounted on an output shaft, the driven pulley comprising another fixed member and another movable member, the another movable member being similarly actuated by another hydraulic cylinder supplied with a line pressure to form another V-shaped opening between said another movable member and said another fixed member, an endless belt member spanning the pulleys so that an effective diameter of the pulleys can be varied with regard to each other so that different speed ratios can be obtained, a first torque sensing means, a second torque sensing means and a control circuit, said control circuit including a first calculating means, a memory means, a second calculating means, a comparison means and hydraulic fluid control means, said method comprising the steps of:

detecting at least first and second input torques on the input shaft and at least first and second output torques on the output shaft, a first input torque signal having a first input value indicative of the first input torque, a second input torque signal having a second input value indicative of the second input torque, the second input value being detected a first predetermined time period after the first input value is detected, a first output torque signal having a first output value of the output torque, a second output torque signal having a second output value of the output torque, said second output value being detected a second predetermined time period after the first output value is detected, said first predetermined time period being equal to said second predetermined time period;

calculating a first ratio between the first input and output values of the first input and output torques and a second ratio between the second input and output values of the second input and output torques;

calculating a third ratio between the first and second ratios;

comparing a stored predetermined value with the calculated third ratio;

controlling the line pressure supplied to said another hydraulic cylinder of the driven pulley in accordance with said comparison;

whereby the line pressure control means increases or decreases the line pressure such that an actual line pressure approaches an optimum line pressure.

23. The method of claim 22, further comprising detecting an input revolution number of the input shaft and an output revolution number of the ouput shaft before detecting the input and output torque.

24. The method of claim 23, further comprising detecting a frequency of a power stroke of the engine from the detected input revolution number of the input shaft.

25. The method of claim 24, further comprising determining absolute values of the input and output torques after detecting said frequency of said power stroke.

26. The method of claim 25, further comprising determining amplitudes of the input and output torques after detecting said absolute values.

27. The method of claim 26, further comprising determining a compensating value in accordance with the result of said comparison.

28. The method of claim 27, wherein the compensating value is positive when the third ratio is less than the stored predetermined value and the compensating value is negative when the third ratio is greater than the stored predetermined value.

29. The method of claim 28, further comprising calculating at least a first and a second feedback voltage, the second feedback voltage being calculated a third predetermined time period after calculating the first feedback voltage, the value of the second feedback voltage being calculated by adding the compensating value to the value of the first feedback voltage.

30. The method of claim 29, further comprising calculating an initial value of an input voltage from the detected input torque of the input shaft, the detected input revolution number of the input shaft, and the detected output revolution number of the output shaft.

31. The method of claim 30, wherein the input voltage is calculated by adding the value of the second feedback voltage to the initial value.

* * * * *